United States Patent [19]

Tatsuno

[11] 3,741,521
[45] June 26, 1973

[54] PIPE COUPLING WITH SAFETY VALVE
[76] Inventor: Hiyoshi Tatsuno, 4-4-11 Shirogane, Minato-ku, Tokyo, Japan
[22] Filed: June 3, 1971
[21] Appl. No.: 149,694

[52] U.S. Cl. ................ 251/149.7, 137/68, 285/2
[51] Int. Cl. ................ F16l 29/00, F16l 37/28
[58] Field of Search ............. 251/149.7; 137/68; 285/2, 3

[56] References Cited
UNITED STATES PATENTS
3,361,406  1/1968  Cruse ............... 251/149.7
3,474,810  10/1969  Welsh .............. 251/149.7 X
3,532,101  10/1970  Snyder, Jr. ........ 251/149.7 X
1,199,029  9/1916  Hovis ............... 285/2
3,502,353  3/1970  Borns ............... 285/2

Primary Examiner—William R. Cline
Attorney—Waters, Roditi, Schwartz & Nissen

[57] ABSTRACT

A safety pipe coupling for liquid dispensing machines, which is particularly useful for a suspended nozzle type liquid fuel supplying device, has a first portion which includes a valve means biased by a spring toward its valve seat, a second portion connected to a nozzle at one end, means for connecting said first and second portions under normal conditions and for releasing the portions from each other when a stress larger than a predetermined value is applied therebetween, and a means for holding said valve open against the spring during normal conditions.

3 Claims, 6 Drawing Figures

PIPE COUPLING WITH SAFETY VALVE

FIELD OF THE INVENTION

The present invention relates to a safety coupling for gasoline and like liquid-fuel dispensing machines, and more particularly to a safety pipe coupling to be arranged between a dispensing nozzle and the free end of a flexible conduit in a suspended-nozzle type liquid-fuel dispensing apparatus.

BACKGROUND

In fuel dispensers, the dispensing nozzle is connected to the outlet or free end of a flexible circuit, the inlet end of which is connected to a fuel reservoir through a fixed conduit.

In conventional fuel dispensers having a column or post-like body member and an island on which the body member is provided, it is not always thought necessary to provide a safety coupling between the dispensing nozzle and the flexible conduit since the length of the flexible conduit connecting the dispensing nozzle to the fixed conduit is relatively short and the servicing area is correspondingly narrow. Thus danger due to an accident resulting from poor driving by a vehicle operator cannot be positively avoided such as, for example, the dispensing nozzle's being disconnected from the flexible conduit or the flexible conduit's being broken or disconnected from the fixed conduit and gushing out inflammable oils. In fact, safety pipe couplings have not been known to be provided for such fuel dispensers.

In new type fuel dispensers, for instance, as proposed in my U.S. Pat.No. 3,395,723, a relatively long flexible conduit is used to spread out over the service area for each dispensing machine. Thus, it cannot be said, for example, that there is no danger that the flexible conduit or dispensing nozzle may not undesirably be caught onto a portion of a vehicle, under such circumstances,. If the vehicle should be started, the flexible conduit will be pulled away from the fixed conduit or will be broken and will gush out inflammable oil or the like, which may cause a serious fire. Such trouble may be caused by a vehicle driver who moves his vehicle with a dispensing nozzle held in the fuel tank inlet of his vehicle or catches a flexible conduit of a fuel dispensing machine which is supplying another vehicle.

SUMMARY OF THE INVENTION

A principal object of the present invention is to provide a safety pipe coupling at a relatively low cost to obviate and overcome the above-mentioned disadvantages in fuel dispensing machines.

A specific object of the present invention is to provide a safety pipe coupling adapted for being arranged between a dispensing nozzle and associated flexible conduit or between a manual switch housing provided at the outlet end of a flexible conduit and the associated dispensing nozzle in the case of a suspended nozzle type fuel dispenser, the coupling being separated into two parts upon application of a force above a predetermined level to immediately interrupt the fuel flow therethrough.

BRIEF DESCRIPTION OF THE DRAWING

Other objects of the present invention and various advantages to be attained by the present invention will be apparent from the following detailed description of some embodiments as illustrated, by way of example, in the accompanying drawings, in which.

DETAILED DESCRIPTION

Figure 1:
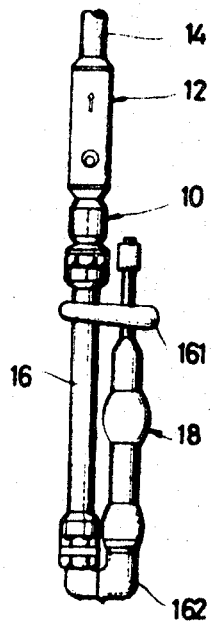
FIG.1 shows a safety pipe coupling according to the present invention, with the coupling being applied to a suspended-nozzle type fuel dispenser.

In a suspended-nozzle type fuel dispensing machine, a safety pipe coupling 10 according to the present invention is arranged between one end of an electrical switch housing 12 for manually controlling the winding of a flexible conduit 14 and one end of a nozzle mounting member 16 which has a nozzle holder 161 thereon and is connected to a dispensing nozzle 18 through an universal coupling 162, as seen in FIG.1. The other end of said switch housing 12 is connected to the outlet end of the flexible conduit 14 whose inlet is in turn connected to a fixed conduit (not shown) located above vehicular passageways in the associated station and connected thereat to a reservoir (not shown). In case the coupling 10 is used for a conventional type fuel dispensing machine having a column or post-like body member on which the dispensing nozzle is hung, however, the manual switches for controlling the vertical movement of the flexible conduit and resetting the dial of an indicator (not shown) counting or metering the amount of fuel supplied and the universal joint can be omitted and, thus, the safety coupling may be connected to the flexible conduit 14 at one end and to the dispensing nozzle 18 at the other end by means of suitable fixing members.

Figure 2A:
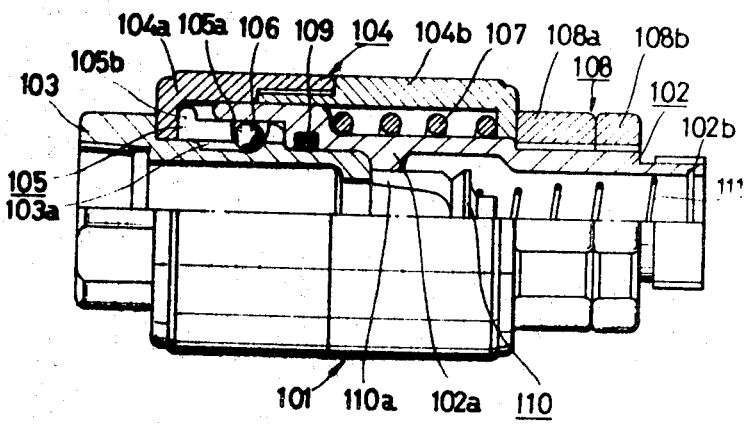
FIG.2A is a partial fragmentary view of a first embodiment of the joint according to the present invention.

In the first embodiment as shown in FIG.2A, a safety coupling generally represented by reference numeral 101 comprises a first tubular member 102 one end of which can be secured to the switch housing 12 or to the outlet of the conduit 14 through a suitable fixing means (not shown), a second tubular member 103 one end of which can also be secured to the dispensing nozzle 18 directly or through the nozzle mounting member 16 and the universal joint 162, and a covering member 104 which covers the slidably engaging portions of said first and second tubular members 102 and 103 and which consists of two elements 104a and 104b. Provided within the covering member 104 is a ring-like member 105 having several openings or perforations 105a along its periphery to hold ball members 106 therein. Each opening 105a is preferably so formed that the diameter at the outer surface of the ring 105 is larger than that of the ball 106 but the diameter at the inner surface is smaller than that of the ball so that the ball 106 can not pass through the opening 105a.

The covering member 104 is not secured to any member but the elements 104a and 104b respectively have flange portions which at one end are meshed with each other.

Between the covering member 104 and the first tubular member 102 the bore of which constitutes a fuel flow passage together with the bore of the second tubular member 103, a compression spring 107 is inserted to press the first tubular member 102 toward the dispensing nozzle. A nut assembly 108 is provided on the first tubular member 102 and acts as an abutting means for the flexible conduit 14 or the switch housing 12. Preferably, the nut assembly 108 consists of two nuts 108a and 108b so as to prevent any loosening thereof. The first tubular member 102 houses a sealing ring 109 in contact with the second tubular member 103 to prevent the leakage of fuel passing through the fuel flow passage defined by the first and second tubular members 102 and 103, and includes also a valve 110 inserted in the bore thereof and engageable with a valve seat 102a defined on the inside surface thereof. A compression spring 111 is inserted between a suitable seat 102b preferably provided on the inner surface of the first tubular member 102 and the valve 110, so as to normally press the valve 110 toward the valve seat 102a.

In normal or assembled condition as illustrated in FIG.2A, a leg portion 110a of the valve 110 abuts against the edge of the second tubular member 103 and is maintained in a position such that the valve is kept in open condition to allow fuel flow therethrough against the action of the spring 111.

Figure 2B:
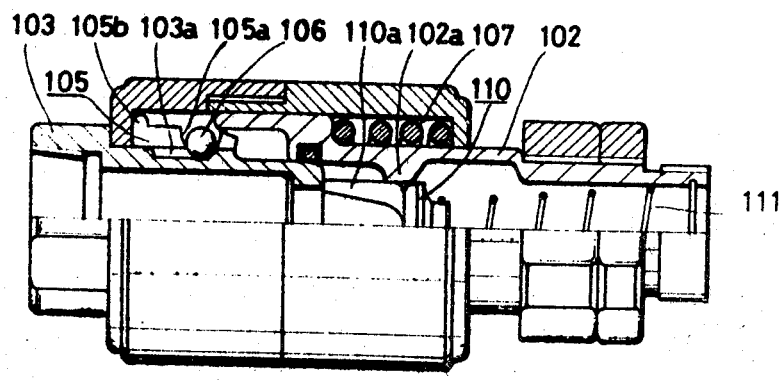
FIG.2B is a partial fragmental view of the coupling as shown in FIG.2A, showing excess tension being applied thereto.

If an excessive force is applied to the second tubular member 103 of the joint 101 such as, for instance, by the accidental movement of a vehicle while carrying the nozzle 18 therealong, the cover member 104 will be moved toward the nozzle against the force of the spring 107 due to engagement, through the ball members 106, between the second tubular member 103 and the ring-like member 105, the latter having a flange portion 105b which engages the flanged element 104a. When the cover member is further moved leftwardly to the position as shown in FIG.2B, the ball members 106 which are restrained in their normal position as defined by the inner surface of the first tubular member 102, the wall of the opening 105a and a depression 103a formed in the outer surface of the second tubular member 103 will move upwardly with a pressure imparted thereto by the edge portion of the depression 103a. As a result, the engagement of the second tubular member 103 with the ring-like member 105, through the ball members is released to allow a pulling out of the second tubular member 103, by the tension force applied thereto, from the other parts of the safety coupling. Upon separation of the second tubular member 103, the leg portion 110a of the valve 110 is released from abutment against the edge of the second tubular member and the valve 110 is then pressed by the spring 111 toward its valve seat 102a to close the fuel passage. The pressure of the fuel flow applied to the valve also helps to immediately close it. After the second tubular member 103 has been separated, the ball members will be returned to their initial positions by a relative rightward movement of the first tubular member resulting from the force of the spring 107.

Reengagement of the separated second tubular member 103 with the other portion of the coupling can easily be effected by pulling the cover member 104 against the force of the spring 107 and inserting the end portion of the second tubular member 103 into the ring-like member 105 and pressing the former against the force of the spring 107, until the shoulder portion of the second tubular member 103 abuts against the flanged element 104a.

Figure 3:
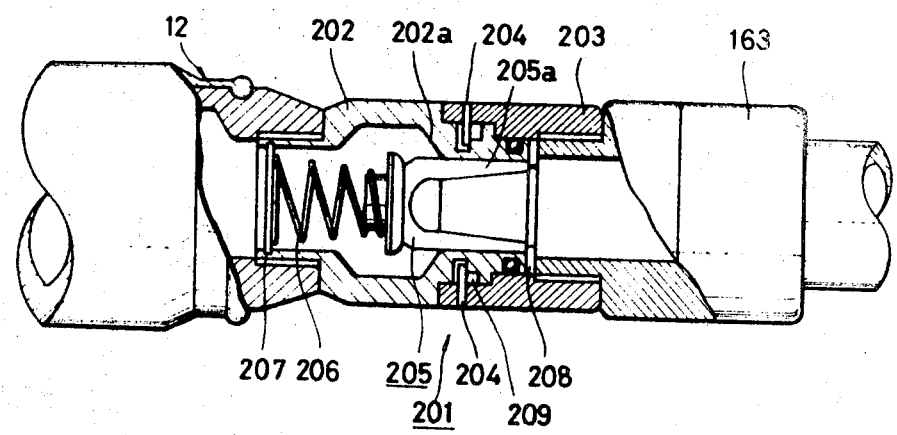
FIG.3 is a longitudinal section of a second embodiment of the invention.

The second embodiment, which is the safety coupling 201 shown in FIG.3, is different from the first embodiment 101 as shown in FIG.2A and 2B in that one or more connecting members 204 which are broken before an excessively large stress is applied thereto are provided in lieu of the ringball means.

The safety joint 201 comprises two cylindrical members 202 and 203, which are joined by the connecting members 204, for instance 2 to 4 stopper pins made of comparatively weak material such as plastic, and cutting means 209 made of a hard substance such as, for instance, steel to cut a connecting members when the large force is applied between the cylindrical members 202 and 203. The free end of the first cylindrical member 202 can be connected to the flexible conduit preferably through the switch housing 12 and the free end of the other or second cylindrical member 203 can be connected to the nozzle mounting means 16 by a suitable fixing means 163 or directly to the dispensing nozzle 18.

The first cylindrical member 202 corresponds to the first tubular member 102 in FIGS.2A and 2B, and includes a valve 205, valve seat 202a, compression spring 206 acting to press the valve toward the valve seat 202a and a means 207 for fixing one end of the spring 206. When the second cylindrical member 203 is connected to the first cylindrical member 202, a valve adapter 208 is inserted therebetween in such a manner that the adapter 208 abuts against a leg 205a of the valve member 205 and maintains the valve open against the force of the spring 206.

If an extraordinary high tension is applied between the first and second cylindrical members 202 and 203, the connecting members 204 are cut by the cutting member 209, before separation of the second cylindrical member 203 from the first one. At the same time, the valve 205 is pressed outwardly by the action of the spring 206 and flow of fuel, since valve adapter 208 is no longer opposed. Thus, the flow passage is tightly closed at the end of the first cylindrical member 202, so as to prevent fuel from gushing out of the same.

In order to connect the first cylindrical member 202 to the second one 203 again, the valve adapter 208 is inserted in the second cylindrical member 203, and then the first cylindrical member 202 is forced toward the second member 203 against the action of the spring 206 until the free end of the second cylindrical member 203 abuts on the shoulder of the first one 202. Thereafter, fresh connecting pins 204 are mounted so as to engage both cylindrical members 202 and 203. With this arrangement of the safety coupling 201, the mechanical strength of the coupling itself can easily be adjusted by selecting the material of the connecting pins 204 and, if necessary by using two or more such members 204.

Figure 4:
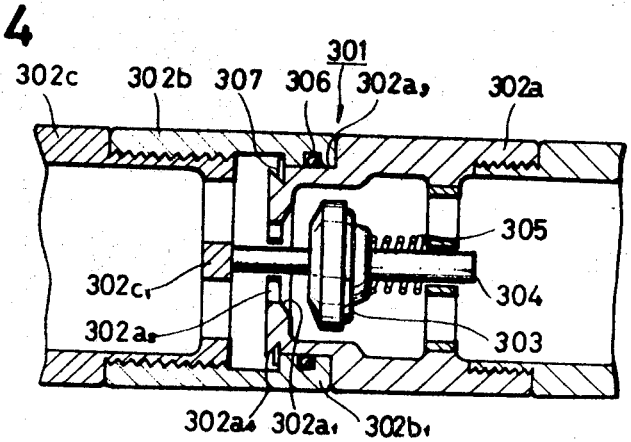
FIG.4 is a view similar to FIG.3 showing a third embodiment.
Figure 5:
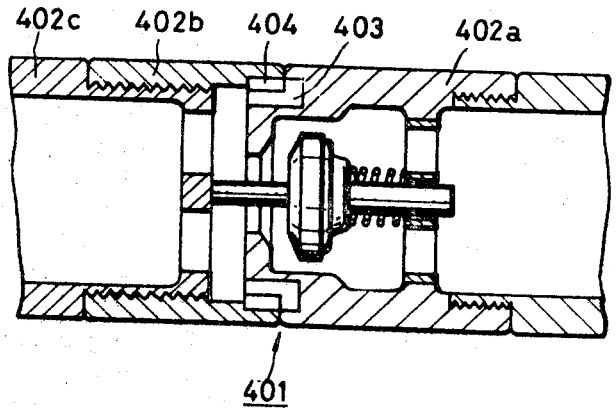
FIG.5 is a view similar to FIG.3 showing a fourth embodiment.

The third and fourth embodiments as shown in FIGS.4 and 5 are different from the preceding embodiments in that safety couplings 301 and 401 comprise three cylindrical members 302a, 302b, 302c and 402a, 402b, 402c, respectively, although the members 302b, 302c and 402b, 402c are threaded to each other, and member 302c or 402c is a fixing means for connecting the safety coupling to the nozzle mounting means 16 or the dispensing nozzle 18 (FIG.1).

As seen in FIG.4, the first cylindrical member 302a one end portion of which is connected to the flexible conduit through a suitable fixing and/or flexible conduit controlling means (FIG.1) includes a valve member 303 fixedly mounted on a central shaft or rod 304 and forced toward a valve seat $302a_1$, having an opening $302a_2$ through which fuel flows, by a compression spring 305. The inner end of the second cylindrical member 302b is made to contact a shoulder $302a_3$ of the first cylindrical member 302a via a flange $302b_1$, and the other or outer end is threadly mounted on the third cylindrical member 302c having a part $302c_1$ at the inner end thereof. Part $302c_1$ abuts the outer end of the shaft 304 and acts as a stopping member therefore to keep the valve 303 open during normal operation of the safety coupling 301. The flange $302b_1$ has a channel in its inner periphery to accommodate a sealing ring 306 for preventing the leakage of fuel through contact with the outer surface of the first cylindrical member 302a. During normal operation, the second cylindrical member 302b is kept in contact and in engagement with the first cylindrical member 302a by an elastic C-shaped ring 307 which is, for instance, a snap ring and is mounted on a tapered shoulder $302a_4$ of the first cylindrical member 302a.

When an excessive force is applied between the nozzle and the flexible conduit, the second cylindrical member 302b is pulled leftwardly (FIG.4) to cause the deformation of the elastic ring 307 and finally effect the disengagement of the latter from the tapered shoulder $302a_4$. As soon as the disengagement occurs, the first and second cylindrical members 302a and 302b are separated from each other by the force applied therebetween. At the same time, the valve 303 is pressed outwardly by the action of the spring 305 and fuel flow pressure to close the flow passage, since member $302c_1$ no longer impedes movement of the rod 304.

The reengagement of the disconnected first and second cylindrical members can be attained in the following manner:

In the first place, the second cylindrical member 302b is disconnected from the third member 302c and is slidely mounted on the free end of the first member 302a. The elastic ring 307 which will be retained within the second cylindrical member even if the latter has been separated from the first one is again mounted on the tapered shoulder $302a_4$ and then the outer end thereof is reconnected to the free end of the third cylindrical member.

The mechanical means for releasably connecting the first and second cylindrical members, employed in the embodiment shown in FIG.4 can be replaced by a magnetic means.

An embodiment of the safety joint 401 using such magnetic connecting means is illustrated in FIG.5 but the construction of the joint 401 is substantially the same as that illustrated in FIG.4 except that at least one magnet, for instance a ring-like magnet 403 is provided at the outer end of the first cylindrical member 402a which magnetically engages with at least one magnet, for instance, another ring-like magnet 404 provided on the inner shoulder portion of the second cylindrical member 402b.

What I claim is:

1. A safety pipe coupling for liquid dispensing machines, said coupling comprising a first cylindrical member including an internal valve seat, a valve means inserted in said first cylindrical member and adapted for being engageable with said valve seat and including a leg portion extending beyond said valve seat, biasing means for biasing said valve means toward the valve seat, a second cylindrical member arranged concentrically with the first cylindrical member, and means for releasably engaging said first cylindrical member with said second cylindrical member so that said second cylindrical member can be released and separated from said first cylindrical member when a force is applied therebetween which exceeds a predetermined level, said valve means seating on said seat when the cylindrical members are separated, means retained by said second cylindrical member against which the leg portion of said valve means abuts whereby the valve means is kept open against the force of said biasing means, said means for releasably engaging said first cylindrical member with the second cylindrical member including at least one connecting pin, said connecting pin being of a comparatively weak material, so that the connecting pin is broken when said force is applied between said first and second cylindrical members, and means for cutting said connecting pin when said force is applied whereby said cylindrical members are separated and said valve means is released to abut said valve seat.

2. A coupling as claimed in claim 1 wherein the means against which the leg portion abuts is a washer.

3. A coupling as claimed in claim 2 wherein said pin is of plastic and said means for cutting is of steel.

* * * * *